United States Patent [19]

Schucker

[11] 4,385,865
[45] May 31, 1983

[54] COUNTERACTING LUG AND LIFTING FIXTURE FOR THE COUNTERWEIGHT OF A BULB TURBINE

[75] Inventor: Thomas R. Schucker, York, Pa.

[73] Assignee: Allis-Chalmers Corporation, Milwaukee, Wis.

[21] Appl. No.: 202,881

[22] Filed: Nov. 3, 1980

[51] Int. Cl.³ ............................................. F01D 17/16
[52] U.S. Cl. ................................ 415/150; 415/121 R; 415/201; 212/195; 294/78 R
[58] Field of Search .................... 415/118, 201, 121 R, 415/150, 151, 159, 160; 248/648, 653; 269/46; 212/195, 196, 198; 294/78 R

[56] References Cited

U.S. PATENT DOCUMENTS 1,200,761 10/1916 Santrock .......................... 414/673 X
2,738,945 3/1956 Shafer .............................. 251/130 X
2,832,635 4/1958 Furnia et al. .................. 294/78 R X

FOREIGN PATENT DOCUMENTS 1142686 1/1963 Fed. Rep. of Germany ...... 212/195

*Primary Examiner*—Harvey C. Hornsby
*Assistant Examiner*—Christine A. Peterson
*Attorney, Agent, or Firm*—Timothy R. Conrad

[57] ABSTRACT

A counterweight link rod incorporates a counterweight lifting lug to provide a safe and easily usable means to lift a counterweight during erection or maintenance for positioning it with respect to a connection point with the wicket gate operating ring. The arrangement also provides a readily available permanent means for attaching an overhead crane hook to the wicket gate operating ring for stroking the gates during erection or maintenance. The arrangement also provides a means for operating the wicket gate operating ring when the operating ring servo-motors fail.

2 Claims, 1 Drawing Figure

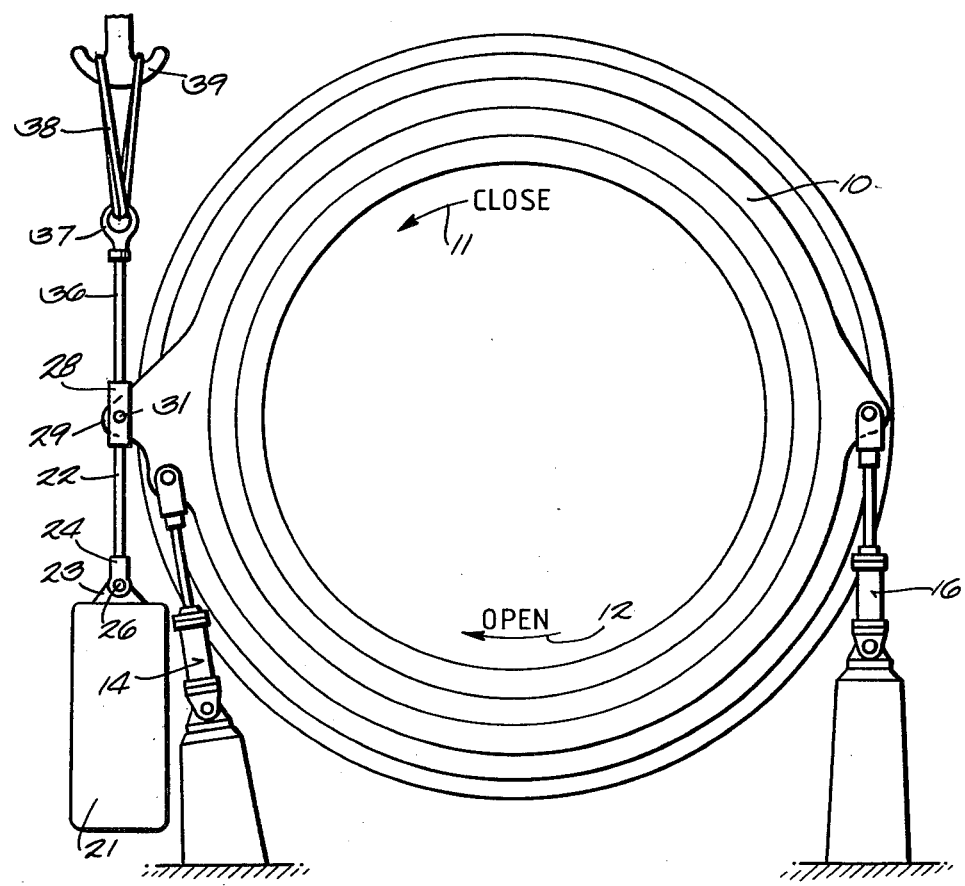

COUNTERACTING LUG AND LIFTING FIXTURE FOR THE COUNTERWEIGHT OF A BULB TURBINE

BACKGROUND OF THE INVENTION

In turbines the wicket gates which control the flow of water through the turbine are operated by a large gate operating ring which is actuated by servo-motors. Many installations also require that a mass counterweight be utilized with the gate operating ring to insure that the wicket gates will be closed should the servo-motors fail. However, in providing counterweights, and especially the larger size counterweights, which can be well over 2,000 pounds needed for large turbines, problems are created. Pickup of the massive counterweight and the manipulation of the mass within the narrow confines of the turbine gallery to align it with the pin that supports it is complicated and rather dangerous. No provisions have been provided for handling the mass and the job is left to the erection crew to handle. In such erection there is no place to easily attach a cable or sling to the gate operating ring to move it with the overhead crane. Also, there has not been a means available to easily attach the overhead crane in an emergency condition. For example, a log jam occurs in the wicket gates and the gate operating ring servo-motors fail. There is no quick way of securing the overhead crane to the operating ring to make it turn so as to allow the log or debris to clear the gates. During erection of the turbine, the wicket gates must be stroked for properly setting the connections. The provision of means for quickly and easily attaching the overhead crane to both the counterweight and the gate operating ring increases the safety factor both at erection time and at emergency maintenance occasions.

SUMMARY OF THE INVENTION

The particular turbine classified as a bulb turbine in which the present invention is incorporated has a counterweight pivotally attached to the gate operating ring. A lifting lug is also provided for the counterweight which facilitates the attachment of an overhead crane hook for installation of the counterweight and for the stroking of the wicket gates during erection and maintenance. The arrangement also provides a means for emergency operation of the gate operating ring upon failure of the gate operating ring servo-motors.

DESCRIPTION OF THE DRAWING

The single FIGURE is viewed partially in vertical section and partially in elevation through a bulb turbine showing the wicket gate operating ring having the lifting lug for the counterweight as well as the attachment for the overhead crane.

DESCRIPTION OF THE INVENTION

In the drawing, the essential components of a bulb turbine with which the invention is related is shown. The number 10 indicates the wicket gate operating ring which is supported for rotation around the axis of the turbine. The gate ring 10 is connected in well-known manners to effect opening and closing movement of the wicket gates (not shown). Thus, rotation of the gate operating ring 10 in a counterclockwise direction as indicated by the directional arrow 11 will effect the closing of the wicket gates. On the other hand, rotation of the gate operating ring 10 in a clockwise direction as indicated by the directional arrow 12 will effect an opening of the associated wicket gates. Movement of the operating ring 10 is effected by a pair of servo-motors 14 and 16. As shown, the servo-motor 14 is angularly disposed so as to provide room for the mass of a depending counterweight 21.

The counterweight 21 is operatively connected to the gate operating ring 10 by a link rod 22. The pivoted connection between the link rod 22 and the lug 23 of the counterweight 21 is by means of a clevis 24 and pin 26 arrangement. At its opposite end, the link rod 22 is provided with a coupling 28 which is pivotally secured to a radially extending projection 29 integrally formed on the peripheral surface of the gate operating ring 10 by operation of a pin 31. Extending upwardly from and secured to the coupling 28 is an elongated lifting lug 36. The free end of the lifting rod 36 is provided with a sling clevis 37 adapted to receive a steel cable sling 38. A crane hook 39 of an overhead crane (not shown) is adapted to receive the loops of the sling 38. Thus, the lifting rod 36 provides a readily and permanently available means to attach the sling to the gate operating ring 10.

With the arrangement set forth, it is possible to fulfill three possible operations with ease and with a high degree of safety. The steel sling 38 is attached to the crane hook 39 and the counterweight lifting lug 36. The counterweight link rod 22 and the counterweight lifting rod 36 are integral. With the counterweight link rod 22 attached to the counterweight 21, the lifting lug 36 operates to permit the crane hook 39 to lift the sling 38, the lifting rod 36, the link rod 22 and the counterweight 21. With the connected components suspended, the positioning of coupling 28 to align its opening with the opening in the gate operating ring projection 29 is easily accomplished facilitating the insertion of the pin 31.

During erection and with the assemblage connected as described with servo-motors 14 and 16 disconnected, the crane hook 39 may be raised to rotate the wicket gate operating ring 10 in a clockwise direction to open the wicket gates. To close the wicket gates, the crane hook 39 is lowered allowing the full weight of the counterweight 21 to provide the force to rotate the wicket gate operating ring in a counterclockwise direction to effect the closing of the wicket gates.

Thus, the assemblage described provides a readily and permanently available means for lifting and positioning the counterweight for connection to the gate operating ring 10. The assemblage also provides a readily available means for the attachment of the crane for easy stroking of the wicket gate during erection and maintenance; and, also provides the means for operating the wicket gates with the wicket gate operating ring servo-motors out of operation.

The embodiments of the invention in which an exclusive property or privilege is claimed are defined as follows:

1. An apparatus for rotating a wicket gate operating ring of a bulb turbine machine where said ring is rotatable about its axis in a rotational direction to an open position and further rotatable in a counterrotational direction to a closed position, the apparatus comprising in operable combination:
   primary means for rotating said ring between said open and closed position; and
   secondary closing means for rotating said ring to said closed position wherein said primary means comprises servomotors operable to rotate said ring between said open and closed positions; said secondary closing means comprises a counterweight having a link rod pivotally attached to said counterweight and extending upwardly therefrom to a free end; a coupling rigidly secured to said free end with said coupling pivotally secured to a radially extending abutment on said gate operating ring with said counterweight providing a constant downward force at said pivotal connection sufficient to urge said ring to said closed position when said servomotors are inoperable; and secondary opening means rotating said ring to said open position comprising a lifting lug rigidly secured to said pivotally connected coupling and extending upwardly therefrom to a free end and means for securing said free end to means for applying a lifting force to said lifting lug.

2. An apparatus according to claim 1 wherein said means for providing said lifting force is an overhead crane.

* * * * *